United States Patent
Smith (10) Patent No.: US 10,538,125 B1
(45) Date of Patent: Jan. 21, 2020

(54) TOOLS FOR LAYING OUT FRAMING MEMBERS

(71) Applicant: Jaye B. Smith, Thayne, WY (US)

(72) Inventor: Jaye B. Smith, Thayne, WY (US)

(73) Assignee: Jaye B. Smith, Thayne, WY (US)

( * ) Notice: Subject to any disclaimer, the term of this patent is extended or adjusted under 35 U.S.C. 154(b) by 203 days.

(21) Appl. No.: 15/797,820

(22) Filed: Oct. 30, 2017

Related U.S. Application Data (60) Provisional application No. 62/415,270, filed on Oct. 31, 2016.

(51) Int. Cl.
*B43L 7/027* (2006.01)
*E04G 21/16* (2006.01)

(52) U.S. Cl.
CPC .............. *B43L 7/027* (2013.01); *E04G 21/16* (2013.01)

(58) Field of Classification Search
CPC ....................................................... B43L 7/023
USPC ................... 33/416, 417, 474, 476
See application file for complete search history.

(56) References Cited

U.S. PATENT DOCUMENTS

| | | | |
|---|---|---|---|
| 247,353 A | 9/1881 | Howard | |
| 492,532 A | 2/1893 | Gilmer | |
| 651,057 A | 6/1900 | Roberts | |
| 691,192 A | 1/1902 | Smith et al. | |
| 832,285 A | 10/1906 | Wilson | |
| 841,666 A | 1/1907 | Cole | |
| 846,274 A | 3/1907 | Yates | |
| 855,257 A | 5/1907 | McCloskey | |
| 937,202 A | 10/1909 | Bailey | |
| 1,102,689 A | 7/1914 | Sargent | |
| 1,196,519 A | 8/1916 | Caylor | |
| 1,236,817 A | 8/1917 | Bick | |
| 1,241,976 A | 10/1917 | Hill | |
| 1,288,331 A | 12/1918 | White | |
| 1,412,162 A * | 4/1922 | Browning | G01B 3/56 33/417 |
| 1,463,605 A | 7/1923 | Walterrs | |
| 1,477,002 A | 12/1923 | Parkhill | |
| 1,526,114 A * | 2/1925 | Brown | G01C 9/26 33/419 |
| 1,588,962 A | 6/1926 | Harrison | |
| 1,704,462 A | 3/1929 | Crandlemere | |
| 1,778,922 A | 10/1930 | Tait et al. | |
| 2,194,632 A * | 3/1940 | Barns | B43L 7/027 403/380 |
| 2,654,954 A | 10/1953 | Lawrence | |
| 2,711,025 A | 6/1955 | Natkie | |
| 3,373,496 A * | 3/1968 | Nelson | E04G 21/1891 33/423 |
| 4,200,990 A | 5/1980 | West | |
| 4,420,891 A | 12/1983 | Orem | |

(Continued)

*Primary Examiner* — George B Bennett
(74) *Attorney, Agent, or Firm* — TraskBritt (57) ABSTRACT

A tool for laying out framing members includes a body comprising a blade and a tongue, the tongue oriented at a right angle to the blade in a common plane, wherein each of the blade and the tongue include indicia marking linear scales. Other indicia on the blade and tongue include information useful for building structures, such as roof structures. For example, indicia can include improved tables of data for marking and cutting rafters of various slope. Other indicia along the blade or the tongue indicate the length of the common rafter per foot of run as function of the slope.

20 Claims, 7 Drawing Sheets

(56) References Cited

U.S. PATENT DOCUMENTS

| | | | |
|---|---|---|---|
| 5,090,129 A | 2/1992 | Cunningham | |
| 5,140,755 A | 8/1992 | Simmons, Jr. | |
| 5,269,066 A | 12/1993 | Walters | |
| 5,575,074 A * | 11/1996 | Cottongim | B25F 1/00 33/474 |
| 5,669,149 A * | 9/1997 | Meitzler | G01B 3/56 33/417 |
| 5,727,325 A | 3/1998 | Mussell | |
| 6,105,266 A | 8/2000 | Cote | |
| 6,408,529 B1 | 6/2002 | Hodges | |
| 6,725,555 B1 | 4/2004 | Moore | |
| 6,868,616 B2 | 3/2005 | Allemand | |
| 7,228,636 B1 | 6/2007 | Moore | |
| 7,854,070 B1 | 12/2010 | Vajentic | |
| 7,958,645 B1 | 6/2011 | Chappell | |
| 9,121,688 B1 | 9/2015 | Schmid | |
| 2004/0231175 A1 * | 11/2004 | Allemand | G01B 3/566 33/429 |
| 2007/0277387 A1 * | 12/2007 | Morrell | B25H 7/00 33/429 |
| 2009/0013546 A1 * | 1/2009 | Keller | B25H 7/00 33/451 |
| 2012/0285028 A1 * | 11/2012 | Atwood | B43L 7/10 33/452 |
| 2013/0227846 A1 * | 9/2013 | Buzzell | B43L 7/02 33/32.2 |
| 2015/0191039 A1 * | 7/2015 | Johnson | B43L 7/14 33/427 |
| 2015/0276367 A1 * | 10/2015 | Lamanna | B25H 7/02 33/404 |

* cited by examiner

TOOLS FOR LAYING OUT FRAMING MEMBERS

CROSS-REFERENCE TO RELATED APPLICATION

This application claims the benefit of U.S. Provisional Patent Application Ser. No. 62/415,270, filed Oct. 31, 2016, the entire disclosure of which is hereby incorporated herein by this reference.

FIELD

Embodiments of the present disclosure relate generally to construction tools and methods for using construction tools to form structures, such as roof structures.

BACKGROUND

A framing square is a long-armed tool having markings or indicia for measurement, which is suitable for marking and cutting lumber at specified angles, including right-angles and angles used for roof structures having various slopes. A framing square may also be referred to in the art as a steel square or carpenter's square. A framing square typically has two arms: a wider arm called a "blade" and a narrower arm called a "tongue," which meet at a 90° angle. By aligning specific markings on the blade and the tongue with an edge of a piece of lumber, a builder can mark the lumber such that cutting along the mark forms a selected angle. Experienced builders can use a framing square to produce some roof structures without the need to calculate angles on paper.

Framing squares can be used to lay out common rafters, hip rafters, and stairs. Framing squares typically include standard roof framing tables of data to assist carpenters in determining how the framing square should be positioned to yield the selected angle for a particular application. For example, framing squares can include information on the length of a common rafter per foot of run, the length of a hip or valley rafter per foot of run, the difference in the length of jack rafters, side cut lengths, etc. Compound cuts can be made by setting a circular saw blade at a selected angle.

Property owners often request buildings having roofs with different shapes. The information on a conventional framing square does not enable even an experienced builder to cut lumber for all roof shapes without resorting to paper-based calculations, trial and error (i.e., make one cut, check to see if the lumber fits, and cut again as necessary), or cutting in place (e.g., high on a ladder or overhanging the edge of a roof structure).

BRIEF SUMMARY

In some embodiments, a tool for laying out framing members includes a body comprising a blade and a tongue, the tongue oriented at a right angle to the blade in a common plane, wherein each of the blade and the tongue comprise indicia marking a linear scale adjacent to at least one edge thereof. Indicia adjacent to a first surface of the body include a first columnar table of values including each of a length of a common rafter per foot of run as a function of a slope; a length of a hip rafter or valley rafter per foot of run as a function of the slope; a required width of the hip rafter or valley rafter as a function of the slope; a length of a common rafter per inch of run as a function of a slope; and a length of a hip rafter or valley rafter per inch of run as a function of the slope. Indicia adjacent to a second surface of the body include a second columnar table of values including each of a length corresponding to a tangent of an angle of a purlin housing in the hip rafter or valley rafter as a function of the slope; a length corresponding to a tangent of an angle of a hip housing in a common rafter as a function of the slope; a first blade angle for cutting a fascia as a function of the slope; a second blade angle for cutting sheathing as a function of the slope; and a third blade angle for cutting the hip rafter or valley rafter as a function of the slope. Indicia along at least one edge of the body indicate the length of the common rafter per foot of run as function of the slope.

DETAILED DESCRIPTION

Some illustrations presented herein are not actual views of any particular framing square, but are merely idealized representations that are employed to describe example embodiments of the present disclosure. Additionally, elements common between figures may retain the same numerical designation.

As used herein, the term "framing square" means and includes a tool having arms oriented at a right angle with markings along edges of the arms to assist in cutting framing members (e.g., lumber, composite materials, metal framing, I-beams, engineered materials, etc.) at appropriate angles to build a structure, such as a roof structure. The arms of a framing square may be referred to herein and in the art as a "blade" and a "tongue."

Figures 1A, 1B:
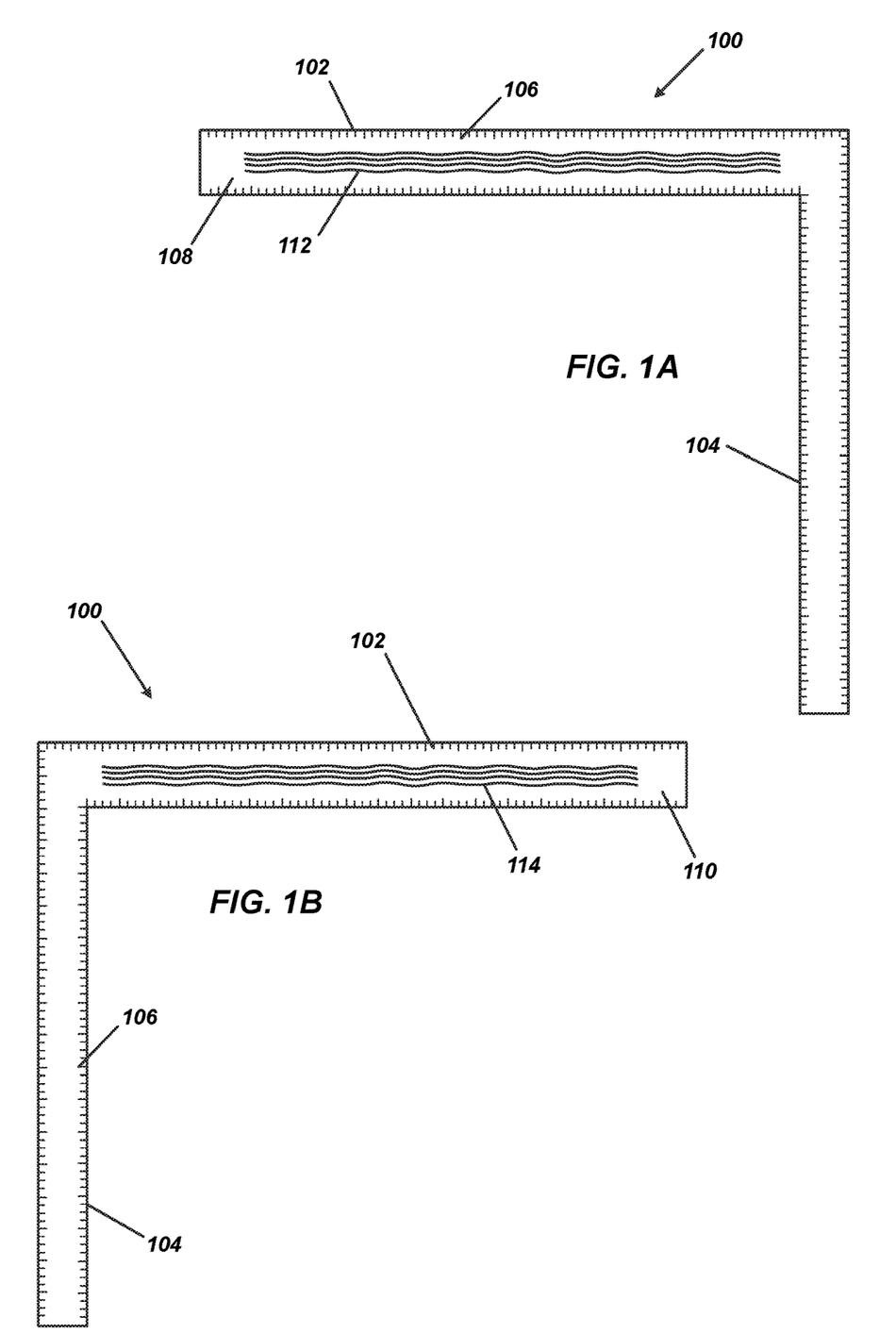
FIG. 1A is a simplified front view of an embodiment of a tool according to the present disclosure.
FIG. 1B is a simplified back view of an embodiment of the tool illustrated in FIG. 1A.

FIGS. 1A and 1B are simplified drawings illustrating a framing square 100 having a blade 102 and a tongue 104 oriented at a right angle in a common plane. The edges of the blade 102 and the tongue 104 include indicia marking linear scales 106, such as in inches (in), centimeters (cm), millimeters (mm), etc. The scales 106 may be on both a front face 108 (FIG. 1A), and on a back face 110 (FIG. 1B) of the framing square 100. The scales 106 may have the same or different units or measurement or subdivisions. For example, one scale 106 may have units of measurement of sixteenths of an inch, another scale 106 may have units of measurement of twelfths of an inch, another scale 106 may have units of measurement of tenths of an inch, and another scale 106 may have units of measurement of eighths of an inch. In some embodiments, all the scales 106 may have the same units of measurement (e.g., mm).

The framing square 100 may also include other indicia 112, 114 to assist a builder in cutting framing members at angles other than 90° right angles and determining lengths of structural members. Such angles and lengths are useful for building a variety of structures, and are particularly useful for building roof structures. For example, indicia 112 on the front face 108 of the blade 102 may include a table having some or all of the following data with values periodically along the blade 102 (e.g., at each inch from 2 to 18 inches): a length of a common rafter per foot of run as a function of roof slope (lC, which may be calculated by the formula $\sqrt{(r^2+144)}$, where r/12 is the roof slope); a length of a hip rafter or valley rafter per foot of run as a function of roof slope (lH, which may be calculated by the formula $\sqrt{(r^2+288)}$); a required width of the hip rafter or valley rafter as a function of roof slope (i.e., to allow full contact of plumb cuts of elements attached to the hip rafter or valley rafter, which may be calculated by the formula lC$\sqrt{2}$/lH); a length of a common rafter per inch of run as a function of roof slope (which may be calculated by the formula lC/12); and/or a length of a hip rafter or valley rafter per inch of run as a function of roof slope (which may be calculated by the formula lH/12).

Though referred to herein as planar, the framing square 100 has a thickness in a direction perpendicular to the views shown in FIGS. 1A and 1B. The framing square 100 may be formed of a material selected to hold its shape when used in construction. For example, the framing square 100 may be formed of aluminum, steel, stainless steel, metal alloys, polymers, combinations thereof, etc. The framing square 100 may be a single unitary structure in which the blade 102 and tongue 104 are integrally formed, such that the angle between the blade 102 and the tongue 104 does not change. The scales 106 and other indicia 112 may be painted onto the front face 108 and the back face 110, but may alternatively be etched into the surface, laser engraved, or otherwise marked in such a manner to form durable markings. Thus, the scales 106 and other indicia 112 may be formed over or recessed below the front face 108 and the back face 110. As used herein, scales 106 and other indicia 112 "on" a surface encompasses all such markings, whether above, below, or coplanar with the surface.

Figure 2:
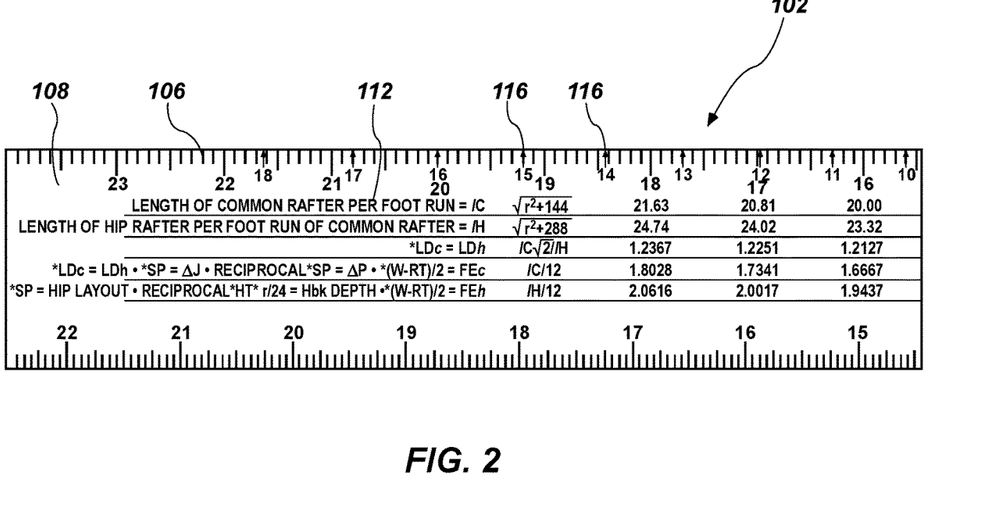
FIG. 2 shows more detail of a top portion of the front face of the tool as illustrated in FIGS. 1A and 1B.
Figure 3:
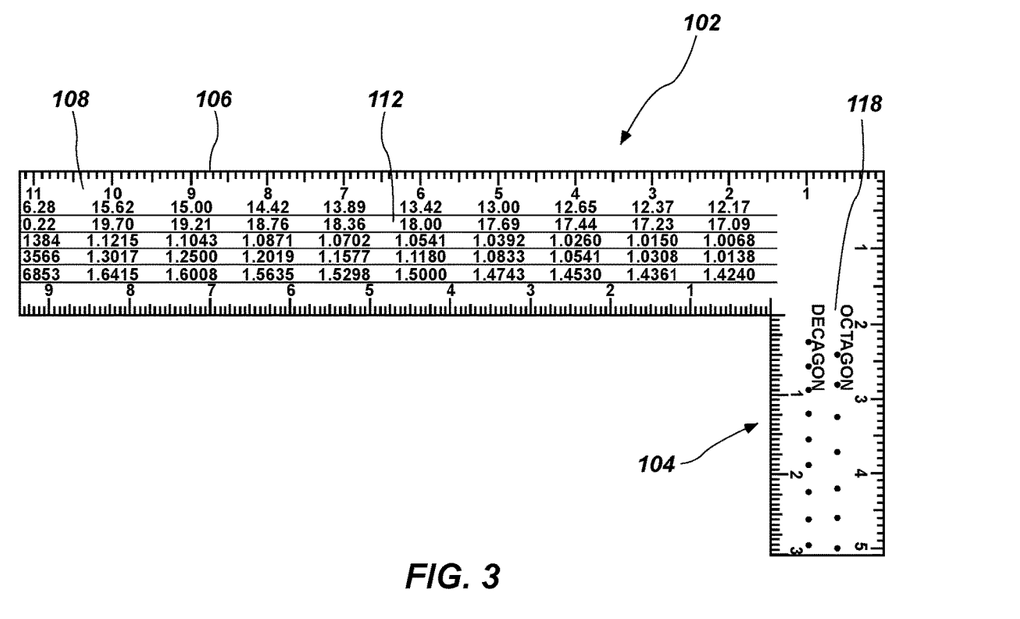
FIG. 3 shows more detail of a portion of the front face of the tool illustrated in FIGS. 1A and 1B.

The indicia 112 are shown in more detail in FIGS. 2 and 3, which illustrate portions of the front face 108 of the blade 102. As shown in FIG. 2, the indicia 112 may include information to assist in building a roof structure having a selected slope. For example, values under the number "18" on the upper scale 106 may correspond to values useful for building a roof having a slope of 18:12, values under the number "17" may correspond to values useful for building a roof having a slope of 17:12, etc.

The indicia 112 may also include definitions and formulas showing how the values in the table are calculated and/or used. This may assist a builder in calculating values that do not appear on the table, should such values be necessary (e.g., values corresponding to roof slopes in between two values on the table, such as a roof slope of 11.5:12). For example, the front face 108 of the blade 102 may include indicia as shown in Table 1, with the top row indicating inches on the upper scale 106:

TABLE 1

| Indicia on front face of blade | | | | | | | | | |
|---|---|---|---|---|---|---|---|---|---|
| | 18 | 17 | 16 | 15 | 14 | 13 | 12 | 11 | 10 |
| lC = $\sqrt{(r^2 + 144)}$ | 21.63 | 20.81 | 20.00 | 19.21 | 18.44 | 17.69 | 16.97 | 16.28 | 15.62 |
| lH = $\sqrt{(r^2 + 288)}$ | 24.74 | 24.02 | 23.32 | 22.65 | 22.00 | 21.38 | 20.78 | 20.22 | 19.70 |
| lC$\sqrt{2}$/lH | 1.2367 | 1.2251 | 1.2127 | 1.1994 | 1.1853 | 1.1704 | 1.1547 | 1.1384 | 1.1215 |
| lC/12 | 1.8028 | 1.7341 | 1.6667 | 1.6008 | 1.5366 | 1.4743 | 1.4142 | 1.3566 | 1.3017 |
| lH/12 | 2.0616 | 2.0017 | 1.9437 | 1.8875 | 1.8333 | 1.7815 | 1.7321 | 1.6853 | 1.6415 |
| | 9 | 8 | 7 | 6 | 5 | 4 | 3 | 2 | |
| lC = $\sqrt{(r^2 + 144)}$ | 15.00 | 14.42 | 13.89 | 13.42 | 13.00 | 12.65 | 12.37 | 12.17 | |
| lH = $\sqrt{(r^2 + 288)}$ | 19.21 | 18.76 | 18.36 | 18.00 | 17.69 | 17.44 | 17.23 | 17.09 | |
| lC$\sqrt{2}$/lH | 1.1043 | 1.0871 | 1.0702 | 1.0541 | 1.0392 | 1.0260 | 1.0150 | 1.0068 | |
| lC/12 | 1.2500 | 1.2019 | 1.1577 | 1.1180 | 1.0833 | 1.0541 | 1.0308 | 1.0138 | |
| lH/12 | 1.6008 | 1.5635 | 1.5298 | 1.5000 | 1.4743 | 1.4530 | 1.4361 | 1.4240 | |

The back face 110 of the blade 102 may include additional indicia 114 to assist a builder in cutting framing members, and may include another table of data. For example, the back face 110 of the blade 102 may include indicia 114 having some or all of the following data with values periodically along the blade 102: a length corresponding to a tangent of an angle of a purlin housing in the hip rafter or valley rafter as a function of the slope; a length corresponding to a tangent of an angle of a hip housing in a common rafter as a function of the slope; a first blade angle for cutting a fascia as a function of the slope; a second blade angle for cutting sheathing as a function of the slope; and/or a third blade angle for cutting the hip rafter or valley rafter as a function of the slope.

Figure 4:
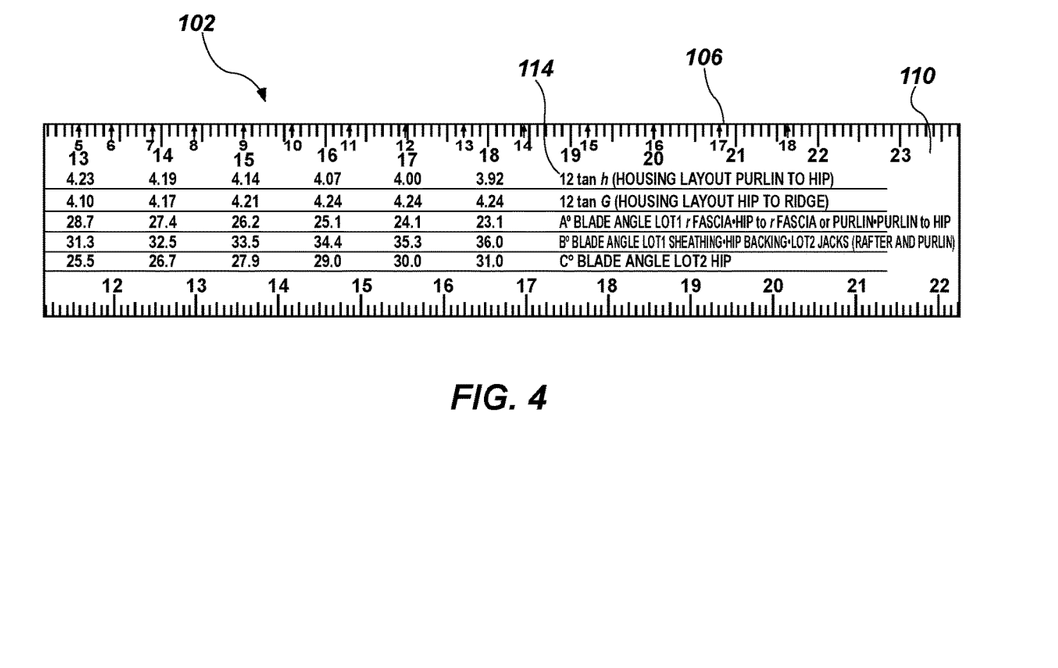
FIG. 4 shows more detail of a portion of the back face of the tool illustrated in FIGS. 1A and 1B.
Figure 5:
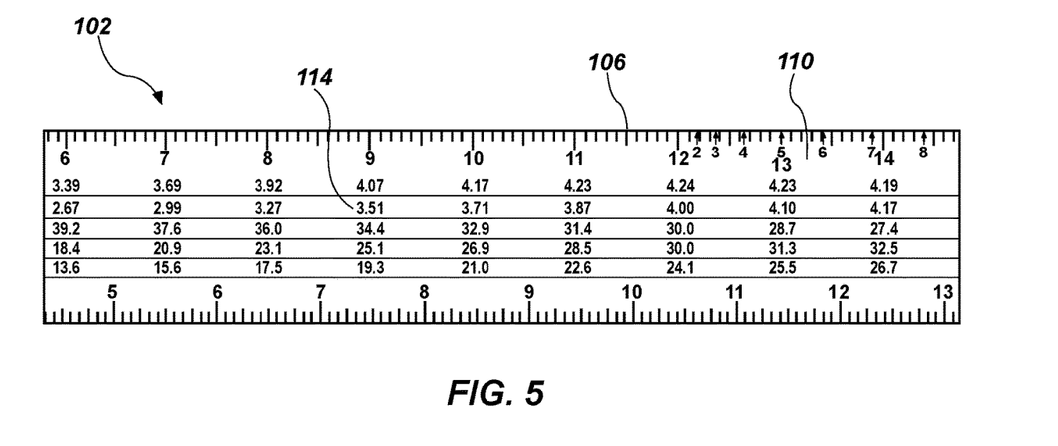
FIG. 5 shows more detail of a portion of the back face of the tool illustrated in FIGS. 1A and 1B.
Figure 6:
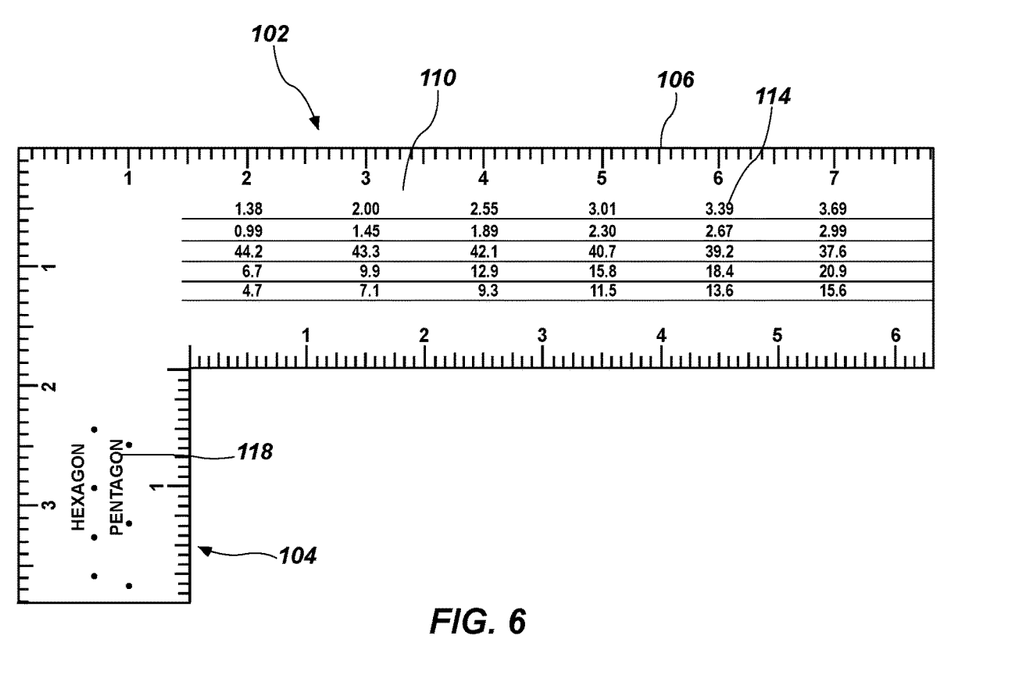
FIG. 6 shows more detail of a portion of the back face of the tool illustrated in FIGS. 1A and 1B.

The indicia 114 are shown in more detail in FIGS. 4 through 6, which illustrate portions of the back face 110 of the blade 102. As shown in FIG. 4, the indicia 112 may include information to assist in building a roof structure having a selected slope. For example, values under the number "18" on the upper scale 106 may correspond to values useful for building a roof having a slope of 18:12, values under the number "17" may correspond to values useful for building a roof having a slope of 17:12, etc.

The indicia 114 may also include definitions and formulas showing how the values in the table are calculated and/or used. This may assist a builder in calculating values that do not appear on the table, should such values be necessary (e.g., values corresponding to roof slopes in between two values on the table, such as a roof slope of 12.5:12). For example, the indicia 114 on the back face 110 of the blade 102 may include indicia as shown in Table 2:

TABLE 2

| Indicia on back face of blade | | | | | | | | |
|---|---|---|---|---|---|---|---|---|
| 2 | 3 | 4 | 5 | 6 | 7 | 8 | 9 | |
| 1.38 | 2.00 | 2.55 | 3.01 | 3.39 | 3.69 | 3.92 | 4.07 | 12 tan h |
| 0.99 | 1.45 | 1.89 | 2.30 | 2.67 | 2.99 | 3.27 | 3.51 | 12 tan g |
| 44.2 | 43.3 | 42.1 | 40.7 | 39.2 | 37.6 | 36.0 | 34.4 | A° Blade Angle LOT1 rFascia |
| 6.7 | 9.9 | 12.9 | 15.8 | 18.4 | 20.9 | 23.1 | 25.1 | B° Blade Angle LOT1 Sheathing |
| 4.7 | 7.1 | 9.3 | 11.5 | 13.6 | 15.6 | 17.5 | 19.3 | C° Blade Angle LOT2 Hip |
| 10 | 11 | 12 | 13 | 14 | 15 | 16 | 17 | 18 |
| 4.17 | 4.23 | 4.24 | 4.23 | 4.19 | 4.14 | 4.07 | 4.00 | 3.92 | 12 tan h |
| 3.71 | 3.87 | 4.00 | 4.10 | 4.17 | 4.21 | 4.24 | 4.24 | 4.24 | 12 tan g |
| 32.9 | 31.4 | 30.0 | 28.7 | 27.4 | 26.2 | 25.1 | 24.1 | 23.1 | A° Blade Angle LOT1 rFascia |
| 26.9 | 28.5 | 30.0 | 31.3 | 32.5 | 33.5 | 34.4 | 35.3 | 36.0 | B° Blade Angle LOT1 Sheathing |
| 21.0 | 22.6 | 24.1 | 25.5 | 26.7 | 27.9 | 29.0 | 30.0 | 31.0 | C° Blade Angle LOT2 Hip |

Figure 7A:
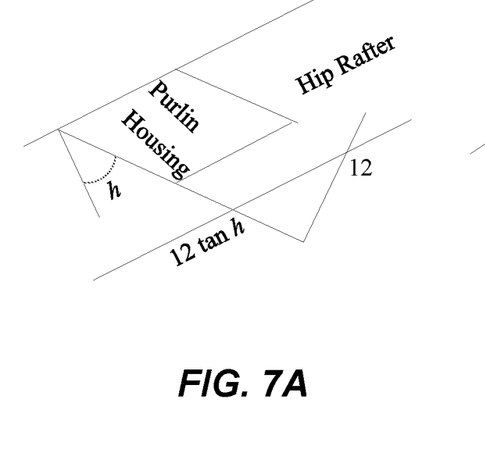
FIG. 7A shows an angle at which purlin housings in a hip rafter or valley rafter may be cut.

The values associated with 12 tan h in Table 2 and on the back face 110 of the blade 102 may be used to layout an angle for a purlin housing in a hip rafter or valley rafter. As shown in FIG. 7A, a purlin housing may be cut at an angle h, which is a function of the roof slope. The framing square 100 may be placed on a rafter such that one arm intersects the rafter at 12 inches, and the other arm intersects the rafter at the value of 12 tan h for a selected slope. The angle formed by the second arm and the rafter corresponds to the angle of the purlin housing.

Figure 7B:
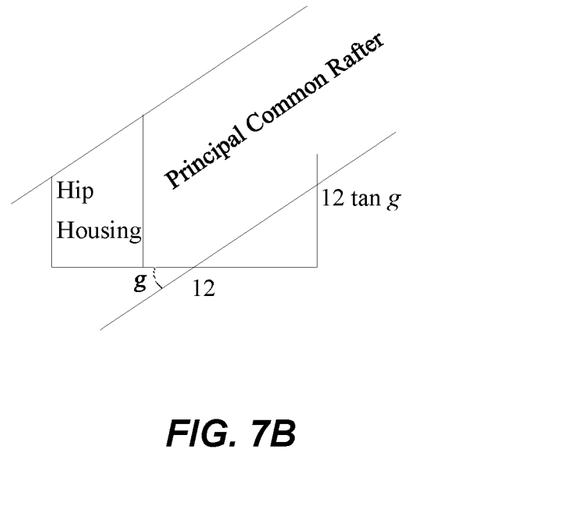
FIG. 7B shows an angle at which hip housings in a common rafter may be cut.

Similarly, the values associated with 12 tan g in Table 2 and on the back face 110 of the blade 102 may be used to layout an angle for a hip housing in a common rafter. As shown in FIG. 7B, a hip housing may be cut at an angle g, which is a function of the roof slope. The framing square 100 may be placed on a rafter such that one arm intersects the rafter at 12 inches, and the other arm intersects the rafter at the value of 12 tan g for a selected slope. The angle formed by the second arm and the rafter corresponds to the angle of the hip housing.

The angles A, B, and C in Table 2 and on the back face 110 of the blade 102 may be used to set a cut angle of a circular saw to make compound cuts to form certain framing members. The angle A may be used for cutting fascia installed on square-cut common rafter tails (referred to in Table 2 as rFascia) by setting the circular saw at angle A and cutting along a line of travel on the face of the fascia (referred to as LOT1 in Table 2), which is a function of the slope of the roof. The face will then be cut at LOT1 along the face, and will angle toward the opposite face such that the fascia member may be installed at 90° relative to another fascia member having the opposite cut. The angle B may be used in a similar manner to cut sheathing.

The angle C may be used to cut hip rafter or valley rafter intersection faces in a similar manner by laying out the line of travel on the edge of the hip rafter or valley rafter (referred to as LOT2 in Table 2) corresponding to the slope of the roof. The face will then be cut at LOT2 along the edge, and will be angled such that the hip rafter or valley rafter may be installed at an intersection between two common rafters.

A face 108, 110 of the blade 102 may also include indicia 116 along at least one edge indicating the length of the common rafter per foot of run as a function of the slope. For example, as shown in FIG. 2, the indicia 116 may appear as arrows or other markings indicated by the slope at lengths corresponding to the length of the common rafter (e.g., a marking at 21.63 inches, labeled "18" to indicate that for a slope of 18:12, the length of the common rafter is 21.63 inches per foot of run). This indicia 116 may appear as a nonlinear scale, and may be in a different font (e.g., size, color, rotation, etc.) to allow a user to easily differentiate between the scales 106 (which may typically be linear).

In some embodiments, the framing square 100 may include indicia 118 to assist in forming polygon-shaped structures. For example, as shown in FIGS. 3 and 6, the tongue 104 may include indicia 118 defining a decagon scale, an octagon scale, a hexagon scale, a pentagon scale, or any other selected scale. For example, polygon scales may be used to determine the length of a side of a polygon having a selected span. That is, for a square piece of material having a length and width a, a caliper may be set to the length corresponding to the numerical value a indicated on the polygon scale. This value corresponds to the length of a side s of the polygon. The caliper may be used to mark, at a 45° angle from the sides of the material, a diagonal of length s. The caliper may be used to mark the other sides of the polygon starting from the ends of that diagonal. This method may be used to form polygons having various numbers of sides, and may thus be more versatile than the octagon scale typically found on conventional framing squares.

A framing square 100 with indicia as disclosed may provide installation information in simple, intuitive terms that are easy to understand and remember. Such a framing square 100 provides data for cutting ridges, hip or valley rafters, common rafters, jack rafters, jack purlins, fascia, and sheathing. The framing square 100 may have benefits over conventional tools in that the indicia on the framing square 100 may be more generally applicable to complicated roof structures, may include saw blade angles appropriate for making cuts, and may assist in building soffits. Improved tables may make it easier for a user to remember how to measure and make cuts for different applications, allowing the user to make cuts faster and more accurately. The framing square 100 may be used to layout cuts such that the cuts may be made by a user standing on the ground, rather than cutting to fit in place (e.g., while a user is on a ladder or on a partially completed roof structure).

Examples

Figure 8:
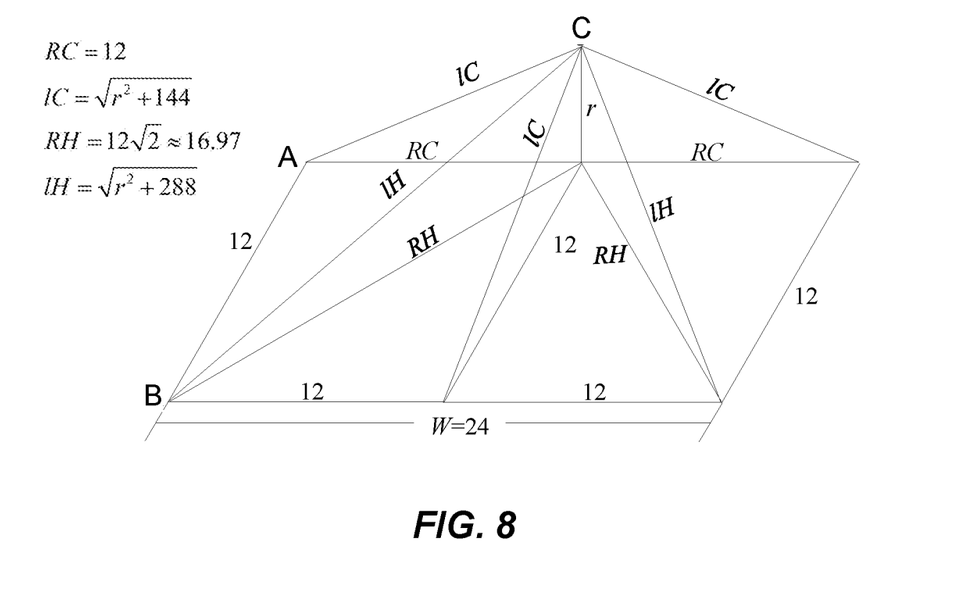
FIG. 8 shows a standard roof framing (SRF) unit diagram for forming a roof structure of selected span.
Figure 9:
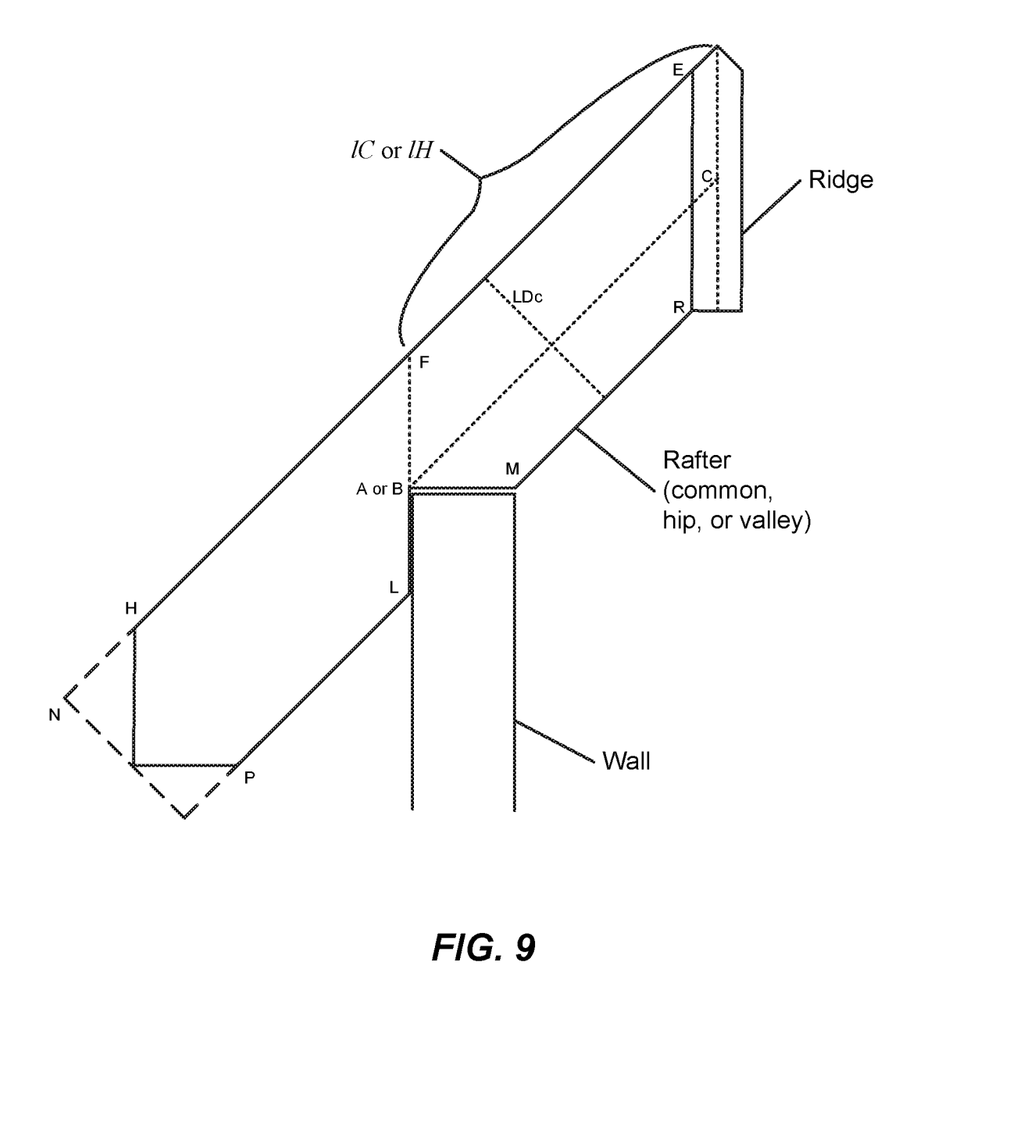
FIG. 9 shows a rafter and some measurements and cuts thereon.
Figure 10:
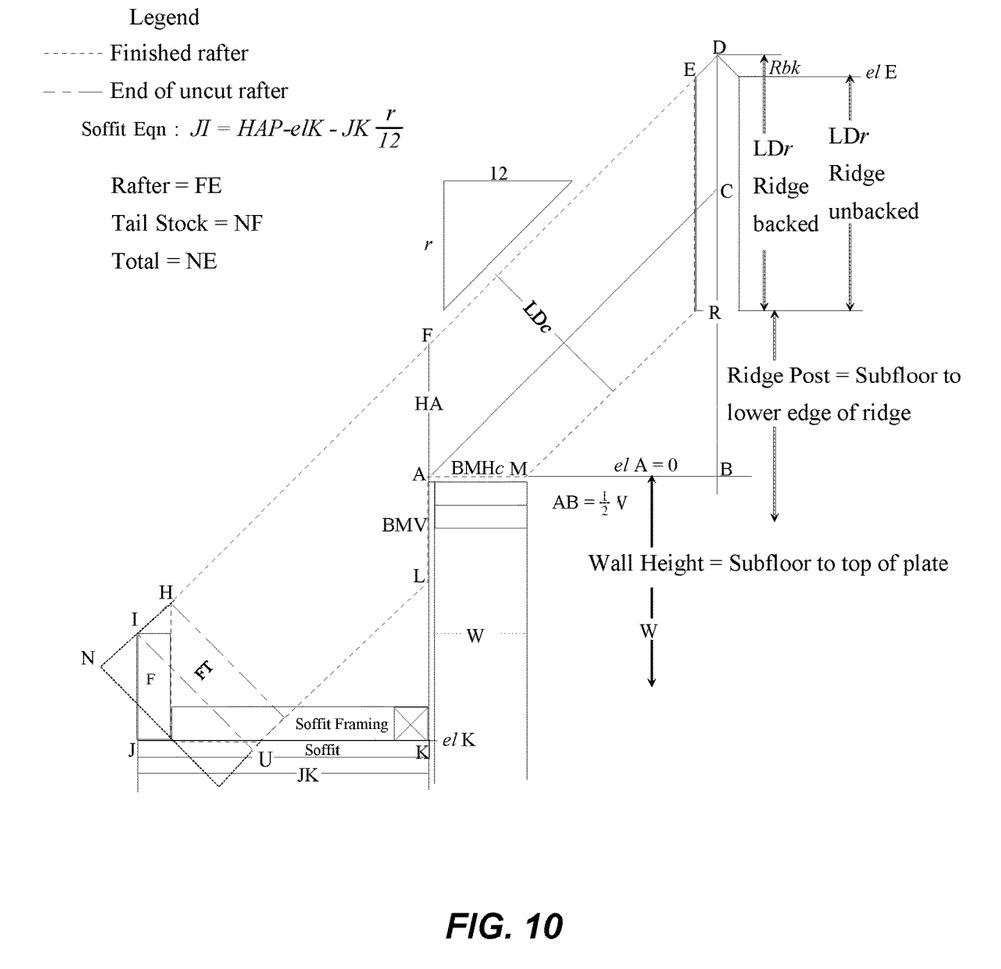
FIG. 10 shows a rafter and some measurements and cuts thereon.

FIG. 8 shows a standard roof framing (SRF) unit diagram for forming a roof structure of span 24. FIGS. 9 and 10 show a rafter and some measurements and cuts thereon. Because the angles remain constant for any ridge span W, the values shown in FIG. 8 can be scaled by a factor of W/24. Thus, the framing point length of a common rafter (defined as the length of a rafter assuming that the ridge beam has zero thickness) is equal to the length lC, shown in FIG. 8, multiplied by the scale factor:

$$FPlC = \frac{W}{24} lC = \frac{W}{24} \sqrt{r^2 + 144}$$

(where r/12 is the roof slope).

The framing point length of hip or valley rafters is equal to the length lH, shown in FIG. 8, multiplied by the scale factor:

$$FPlH = \frac{W}{24} lH = \frac{W}{24} \sqrt{r^2 + 288}.$$

As an example, for a building wing that measures 30 feet (360 inches) from outside face of sheathing to outside face of sheathing, the framing point length (between points A and C in FIGS. 8, 9, and 10) of a common rafter for a roof with a slope of 9/12 is $$FPlC = \frac{360}{24} \sqrt{9^2 + 144} = \frac{360}{24} \times 15 = 225$$

inches. Such a value can be easily computed from the indicia 112 on the front face 108 of the blade 102 of the framing square 100 shown in FIGS. 1A and 1B by locating the value for lC, in Table 1 under the number 9 (corresponding to a slope of 9/12), which is equal to $\sqrt{r^2+144}$, which equals 15.

Another method to determine the framing point length is to use the fourth line of data in Table 1 and in the indicia 112 on the front face 108 of the framing square 100. The width of half of the roof (180 inches in this example) times the value of lC/12 (1.2500 for a slope of 9/12) yields the same result with a single calculation: 180×1.2500=225 inches.

To account for the thickness of the ridge beam, the cut length is shorter than the framing point length. With a ridge thickness of 2 inches, the cut length of this rafter is $$FE_C = \frac{360 - 2}{360} \times 225 = 223.75$$

inches.

Similarly, for a hip or valley rafter, the framing point length (between points B and C in FIGS. 8, 9, and 10) is:

$$FPlH = \frac{360}{24} \sqrt{9^2 + 288} = 15\sqrt{369} = 288.14$$

inches. Another method to determine the framing point length is to use the fifth line of data in Table 1 and in the indicia 112 on the front face 108 of the blade 102. The width of half of the roof (180 inches in this example) times the value of lH/12 (1.6008 for a slope of 9/12) yields the same result with a single calculation: 180×1.6008=288.14 inches.

The cut length of this hip or valley rafter is $$FE_h = \frac{360 - 2}{360} \times 288.14 = 286.54$$

inches.

The cut lengths may be measured along the centerline of the rafter upper edge from the long point of the double cheek plumb cut, which distance is between points F and E in FIGS. 9 and 10. The rafter tail stock (between points N and F) required depends on the roof slope, the soffit overhang, and the fascia orientation, and the maximum rafter tail stock occurs when fascia is to be installed plumb.

What is claimed is:

1. A tool for laying out framing members, comprising:
    a body comprising a blade and a tongue, the tongue oriented at a right angle to the blade in a common plane, wherein each of the blade and the tongue comprise indicia marking a linear scale adjacent to at least one edge thereof;
    indicia on a first surface of the body, the indicia comprising a first columnar table of values including each of:
        a length of a common rafter per foot of run as a function of a slope;
        a length of a hip rafter or valley rafter per foot of run as a function of the slope;
        a required width of the hip rafter or valley rafter as a function of the slope;
        a length of a common rafter per inch of run as a function of a slope; and
        a length of a hip rafter or valley rafter per inch of run as a function of the slope;
    indicia on a second surface of the body, the indicia comprising a second columnar table of values including each of:
        a length corresponding to a tangent of an angle of a purlin housing in the hip rafter or valley rafter as a function of the slope;
        a length corresponding to a tangent of an angle of a hip housing in a common rafter as a function of the slope;
        a first blade angle for cutting a fascia as a function of the slope;
        a second blade angle for cutting sheathing as a function of the slope; and
        a third blade angle for cutting the hip rafter or valley rafter as a function of the slope; and
    indicia along at least one edge of the body indicating the length of the common rafter per foot of run as function of the slope.

2. The tool of claim 1, further comprising indicia on a face of the body comprising at least one formula for calculating at least one value in the first columnar table of values or the second columnar table of values.

3. The tool of claim 1, further comprising indicia on a face of the body comprising at least one formula for using at least one value in the first columnar table of values or the second columnar table of values.

4. The tool of claim 1, wherein each of the blade and the tongue comprises a plurality of linear scales having different units of measurement.

5. The tool of claim 4, wherein each of the blade and the tongue comprises a first linear scale having minimum measurement units of tenths of an inch, a second linear scale having minimum measurement units of twelfths of an inch, and a third linear scale having minimum measurement units of sixteenths of an inch.

6. The tool of claim 1, further comprising indicia on the face of the body comprising at least one scale selected from the group consisting of a decagon scale, an octagon scale, a hexagon scale, and a pentagon scale.

7. The tool of claim 1, wherein the body comprises a material selected from the group consisting of stainless steel and aluminum.

8. The tool of claim 1, wherein at least one of the indicia comprise recesses below the face of the body.

9. The tool of claim 1, wherein at least one of the indicia comprise a plurality of markings over the face of the body.

10. The tool of claim 1, wherein the first surface is on a first side of the blade and wherein the second surface is on a second side of the blade opposite the first side.

11. The tool of claim 1, wherein each of the blade and the tongue are integrally formed with the body.

12. A tool for laying out framing members, comprising:
   a body comprising a blade and a tongue, the tongue oriented at a right angle to the blade in a common plane, wherein each of the blade and the tongue comprise indicia marking a linear scale adjacent to at least one edge thereof; and
   indicia adjacent to a surface of the body, the indicia comprising a columnar table of values including at least one value selected from the group consisting of:
      a length of a common rafter per inch of run as a function of a slope; and
      a length of a hip rafter or valley rafter per inch of run as a function of the slope;
      a required width of the hip rafter or valley rafter as a function of the slope;
      a length corresponding to a tangent of an angle of a purlin housing in the hip rafter or valley rafter as a function of the slope;
      a length corresponding to a tangent of an angle of a hip housing in a common rafter as a function of the slope;
      a first blade angle for cutting a fascia as a function of the slope;
      a second blade angle for cutting sheathing as a function of the slope; and
      a third blade angle for cutting the hip rafter or valley rafter as a function of the slope.

13. The tool of claim 12, wherein the indicia comprise recesses below the face of the body.

14. The tool of claim 12, wherein the indicia comprise a plurality of markings over the face of the body.

15. The tool of claim 12, wherein each of the blade and the tongue are integrally formed with the body.

16. A tool for laying out framing members, comprising:
   a body comprising a blade and a tongue, the tongue oriented at a right angle to the blade in a common plane, wherein each of the blade and the tongue comprise indicia marking a linear scale adjacent to at least one edge thereof; and
   indicia along at least one edge of the body comprising a nonlinear scale indicating a length of a common rafter per foot of run as function of a slope.

17. The tool of claim 16, wherein the indicia comprise recesses below the face of the body.

18. The tool of claim 16, wherein the indicia comprise a plurality of markings over the face of the body.

19. The tool of claim 16, wherein each of the blade and the tongue are integrally formed with the body.

20. The tool of claim 16, further comprising indicia on the body comprising at least one scale selected from the group consisting of a decagon scale, an octagon scale, a hexagon scale, and a pentagon scale.

* * * * *